F. E. SCHWENTLER.
WELDLESS BRAKE ROD.
APPLICATION FILED MAY 12, 1915.
1,210,708.                                                      Patented Jan. 2, 1917.
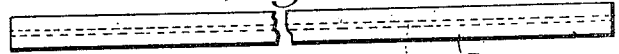
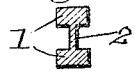
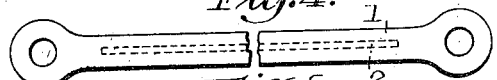
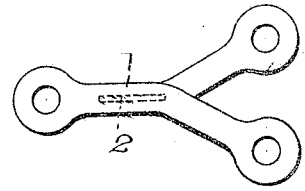
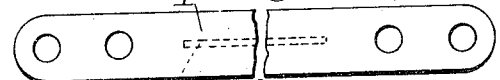
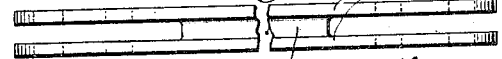
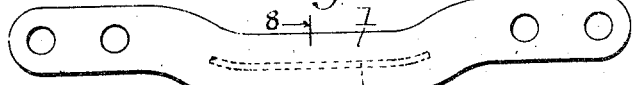
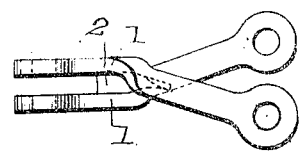
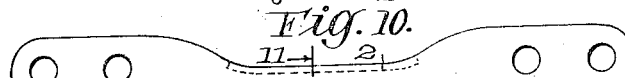
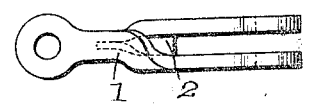
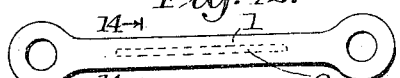
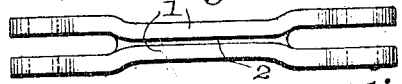
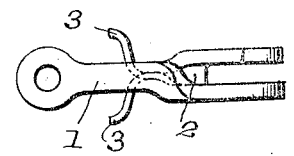
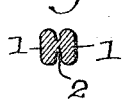 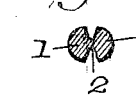 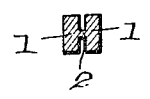
INVENTOR
Francis E. Schwentler
BY
Edward A. Wright
ATTORNEY

UNITED STATES PATENT OFFICE.

FRANCIS E. SCHWENTLER, OF ST. LOUIS, MISSOURI, ASSIGNOR TO THE AMERICAN BRAKE COMPANY, OF ST. LOUIS, MISSOURI, A CORPORATION OF MISSOURI.

WELDLESS BRAKE-ROD.

1,210,708. Specification of Letters Patent. Patented Jan. 2, 1917.

Application filed May 12, 1915. Serial No. 27,477.

*To all whom it may concern:*

Be it known that I, FRANCIS E. SCHWENTLER, a citizen of the United States, and a resident of St. Louis, in the State of Missouri, have invented a certain new and useful Improvement in Weldless Brake-Rods, of which improvement the following is a specification.

This invention relates to the manufacture of rods having jaws formed at the ends, such as used for transmitting stresses in brake rigging, and for other purposes.

In the manufacture of brake rods it has been the practice to make the jaw by welding two pieces together to form a stub end which is then welded to the body of the rod; and also in making eye shaped ends, to upset the eye end from bar stock of the required width and thickness, and then offset each half of the end. Several separate operations have thus been necessary in making up a complete rod including a number of welded joints, and the object of my present invention is to produce weldless rods formed from rolled stock of special section, such as H or I shapes, with relatively heavy or thick heads or flanges joined by a thinner web portion. The jaws may then be formed by displacing or cutting away the web section at the ends of the bar or rod.

In the accompanying drawings: Figures 1, 2 and 3 are a side elevation, plan, and transverse section, respectively, showing a bar of rolled stock of uniform section and of the desired length to form a complete rod embodying my improvement; Figs. 4 and 5, a side view and plan of the completed rod having eye shaped end jaws; Figs. 6 and 7, similar views showing a modification; Fig. 8, a transverse section of the rod shown in Figs. 6, 7 and 9; Fig. 9, a side view similar to Fig. 6, but showing the middle portion offset; Fig. 10, a side elevation showing a modification having the web at the top edge of the side bars; Fig. 11, a transverse section taken on the line 11—11 of Fig. 10; Figs. 12 and 13, a side elevation and plan showing a further modification; Fig. 14, a transverse section taken on the line 14—14 of Fig. 12; Figs. 15 and 16, similar sections showing other modifications; and Figs. 17 to 20 inclusive, side views showing still further modifications.

As shown in Figs. 1, 2 and 3, a bar of rolled stock of uniform I or H section, having two heavy heads or flanges, 1, forming side bars, and joined by a comparatively thin web portion, 2, is employed, the same being cut of a proper length to produce the desired rod. The web portion at the ends is then punched out or displaced, and the prongs thus produced are upset to form the eye shaped jaws at the ends of the side bars, as shown in Figs. 4 and 5. In the modifications shown in Figs. 6 to 11 inclusive, the side bars or flanges of the rod are of sufficient width for receiving the holes for the pivot pins without the necessity of upsetting the ends. This section is also preferable when rods have to be offset, as indicated in Figs. 9 and 10, and may also be used when the rod is subject to compression. In the modification shown in Figs. 10 and 11, the web portion is at the edge of the side bars instead of the middle, this being formed of a U section. The form of rod shown in Figs. 4 and 5, is especially adapted for use in brake designs where the weight of the vertical truck levers is carried by the rod supported on rollers or lugs on the truck frame, as the section affords a good bearing on the supporting lugs or rollers, and there are no welded joints in the rod at these points of support. In all of these constructions, it will be noted, that the stresses are transmitted from one pin to the other in the most direct manner through the substantially straight and parallel side bars or flanges of the rod.

If preferred, the corners of the flanges may be rounded off, as shown in Figs. 14 and 15, and the web portion may be made narrow, thus bringing the side bars closer together, as indicated in Figs. 12 to 16 inclusive. In this construction, the operation of bifurcating and forming the eye ends is the same as before described, except that the ends of the side bars or flanges are opened or spread to secure the required width in the throat of the jaws.

In some brake designs where short connecting members are used, it is also necessary to secure lateral stability, as in attaching a link to a brake beam, and for this purpose the ends may be spread laterally, as shown in Fig. 17. The jaw at the other end may also be twisted at any convenient angle to secure the proper alinement, as indicated in Figs. 18 and 19. As shown in Fig. 20, a portion of the web member may be sheared away and bent around to form stops, 3, for engaging the edge of the brake beam and secure the member against lateral movement.

It will now be seen that by means of my improvement all welded joints are eliminated from the construction of the rod, thereby greatly lessening the liability of accident, as many rod failures are caused by defective welds.

Having now described my invention, what I claim as new and desire to secure by Letters Patent is:

1. A brake rod formed of a uniform rolled metal section comprising two flanges forming side bars, joined by a thin web portion, the web being displaced at the ends to form jaws, said ends having pin holes through the side bars.

2. A brake rod formed of a uniform rolled metal section comprising two flanges forming side bars, joined by a thin web portion, the web being displaced at the ends, and the ends of the side bars being upset to form eye end jaws.

3. A brake rod formed of a uniform rolled metal section comprising two flanges forming side bars, joined by a thin web portion, the web being displaced at the ends, and the ends of the side bars being spread apart to form jaws.

4. A brake rod formed of a uniform rolled metal section comprising two flanges forming side bars, joined by a thin web portion, the web being displaced at the ends to form jaws, and the jaw at one end being twisted at an angle to the jaw at the other end.

FRANCIS E. SCHWENTLER.